United States Patent
Cao

(10) Patent No.: US 12,118,109 B2
(45) Date of Patent: Oct. 15, 2024

(54) DATA STORAGE METHOD, DEVICE, AND STORAGE MEDIUM

(71) Applicant: Beijing Baidu Netcom Science Technology Co., Ltd., Beijing (CN)

(72) Inventor: Jingqi Cao, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 236 days.

(21) Appl. No.: 17/694,411

(22) Filed: Mar. 14, 2022

(65) Prior Publication Data

US 2022/0198052 A1    Jun. 23, 2022

(30) Foreign Application Priority Data

May 14, 2021    (CN) .......................... 202110531307.4

(51) Int. Cl.
*G06F 21/62*    (2013.01)
*H04L 9/06*    (2006.01)
*H04L 9/32*    (2006.01)
*H04L 9/00*    (2022.01)

(52) U.S. Cl.
CPC ...... *G06F 21/6218* (2013.01); *G06F 21/6227* (2013.01); *H04L 9/0618* (2013.01); *H04L 9/3236* (2013.01); *H04L 9/3268* (2013.01); *H04L 9/50* (2022.05)

(58) Field of Classification Search
CPC .................................................. G06F 21/6218
See application file for complete search history.

(56) References Cited

U.S. PATENT DOCUMENTS

| | | | | |
|---|---|---|---|---|
| 10,516,533 | B2* | 12/2019 | Mannan | H04L 9/3226 |
| 2016/0283731 | A1* | 9/2016 | Chow | G06F 16/9027 |
| 2017/0272209 | A1* | 9/2017 | Yanovsky | G06F 3/065 |
| 2020/0159946 | A1* | 5/2020 | Castinado | H04L 63/08 |

FOREIGN PATENT DOCUMENTS

| | | |
|---|---|---|
| CN | 103795696 A | 5/2014 |
| CN | 105791434 A | 4/2016 |
| CN | 109522270 A | 3/2019 |
| CN | 109726567 A | 5/2019 |
| CN | 110110548 A | 8/2019 |

OTHER PUBLICATIONS

First Search Report for CN202110531307.4, mailed Jun. 25, 2021 (one (1) page).
First Office Action for CN202110531307.4, mailed Jun. 25, 2021 (eleven (11) pages).
Supplementary Search Report for CN202110531307.4, mailed Oct. 11, 2021 (one (1) page).

* cited by examiner

*Primary Examiner* — Bradley W Holder
(74) *Attorney, Agent, or Firm* — KDW Firm PLLC

(57) ABSTRACT

Provided are a data storage method, a device, and a storage medium. The implementation scheme is as follows: target data to be stored is divided into data fragment original texts, and storage nodes are allocated for the data fragment original texts; in a trusted execution environment, the data fragment original texts are encrypted according to node information of the storage nodes to obtain data fragment cipher texts associated with the storage nodes; and the data fragment cipher texts are stored to the storage nodes.

18 Claims, 4 Drawing Sheets

DATA STORAGE METHOD, DEVICE, AND STORAGE MEDIUM

CROSS-REFERENCE TO RELATED APPLICATIONS

This application claims priority to Chinese patent application No. 202110531307.4 filed with the China National Intellectual Property Administration (CNIPA) on May 14, 2021, the disclosure of which is incorporated herein by reference in its entirety.

TECHNICAL FIELD

The present disclosure relates to the technical field of computers, in particular, the technical field of blockchain, and the present disclosure may be used for cloud computing and cloud service, specifically, a data storage method, a device and a storage medium.

BACKGROUND

With the development of Internet technologies, the data scale is increasingly expanded, and the single-machine storage scheme simply by increasing the number of disks cannot satisfy the requirements in terms of storage capacity and storage performance.

The decentralized data storage scheme has obvious effects in solving the global storage capacity and trust issue involved in storage, improving the efficiency of data access and the like. However, how to protect the safety of data is very important.

SUMMARY

The present disclosure provides a data storage method, a device, and a storage medium.

According to the present disclosure, a data storage method is provided. The data storage method includes steps described below, target data to be stored is divided into data fragment original texts, and storage nodes are allocated for the data fragment original texts; in a trusted execution environment, the data fragment original texts are encrypted according to node information of the storage nodes to obtain data fragment cipher texts associated with the storage nodes; and the data fragment cipher texts are stored into the storage nodes.

According to the present disclosure, an electronic device is further provided. The electronic device includes at least one processor and a memory communicatively connected to the at least one processor. The memory stores an instruction executable by the at least one processor, and when the instruction is executed by the at least one processor, the at least one processor is caused to perform the data storage method provided in any one of the embodiments of the present disclosure.

According to the present disclosure, a non-transitory computer-readable storage medium storing a computer instruction is further provided. The computer instruction is configured to cause a computer to perform the data storage method provided in any one of the embodiments of the present disclosure.

The safety of the data storage may be improved according to the technology of the present disclosure.

It should be understood that the contents described in this section are not intended to identify key or critical features of the embodiments of the present disclosure, nor are they intended to limit the scope of the present disclosure. Other features of the present disclosure will be readily understood from the following description.

BRIEF DESCRIPTION OF DRAWINGS

The drawings are intended to provide a better understanding of this scheme and are not to be construed as limiting the present disclosure, in which.

DETAILED DESCRIPTION

Exemplary embodiments of the present disclosure are described below in conjunction with the accompanying drawings, in which various details of embodiments of the present disclosure are included to assist understanding, and which are to be considered as merely exemplary. Therefore, those of ordinary skill in the art will recognize that various changes and modifications of the embodiments described herein may be made without departing from the scope and spirit of the present disclosure. Also, descriptions of well-known functions and structures are omitted in the following description for clarity and conciseness.

The scheme provided in an embodiment of the present disclosure is described in detail below in conjunction with the drawings.

Figure 1:
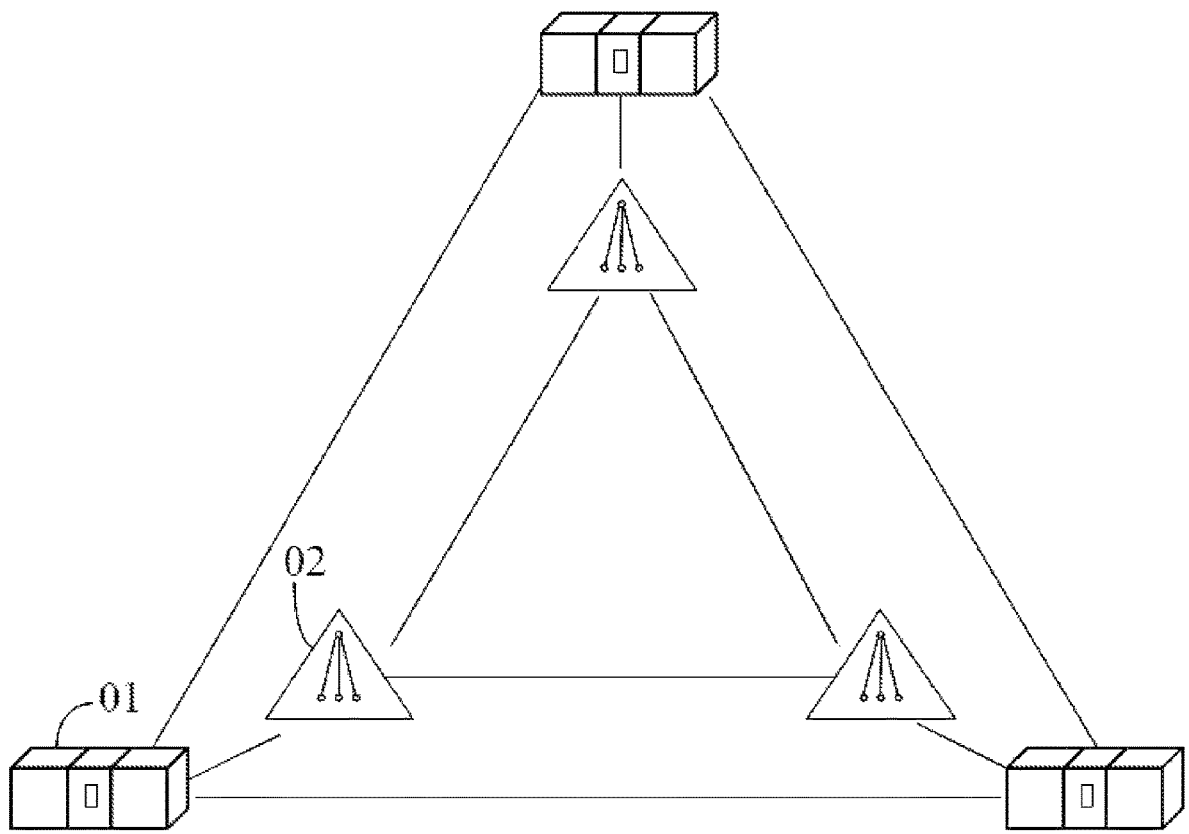
FIG. 1 is a schematic diagram of a data storage system according to an embodiment of the present disclosure.

FIG. 1 is a schematic diagram of a data storage system according to an embodiment of the present disclosure. Referring to FIG. 1, the data storage system may include a decentralized storage system and a blockchain network, the decentralized storage system includes multiple storage nodes 01, and the blockchain network may include multiple blockchain nodes 02. The storage node may be connected to at least one blockchain node for accessing a blockchain.

The storage nodes in the decentralized storage system may serve as the data holder, or the data storage party, or as both the data holder and the data storage party. The data holder refers to the data owner and may process a data original text, for example, target data and any one of the storage nodes belong to the same mechanism, then this storage node may serve as the data holder of the target data; alternatively, the owner of target data trusts any one of the storage nodes, then this storage node may serve as the data holder of the target data. The data storage party is used for storing a data cipher text and cannot be used for processing the data original text.

A storage node serving as the data holder should be a trusted storage node, and a storage node only serving as the data storage party and not as the data holder may or may not be the trusted storage node. The trusted storage node may construct an encryption service program capable of verifying the authenticity based on the trusted execution environment (TEE) technology, and an interface is called by establishing a transport layer safety (TLS) connection between a client of the trusted storage node and the encryption service program; moreover, an initialization interface of the encryption service program is called to generate a root key, which is guaranteed by the characteristics of the TEE technology. The root key cannot be acquired from the outside of the encryption service program, and only exists in the trusted execution environment (i.e., the encryption service program). For example, the Intel software guard extension (SGX) technology may be adopted for creating the trusted execution environment.

In the embodiments of the present disclosure, in a storage process of the target data, a certain trusted storage node in the decentralized storage system serves as the data holder, original texts of the target data are processed to obtain target data cipher texts, and the target data cipher texts are stored in at least two storage nodes serving as the data storage party.

Figure 2:
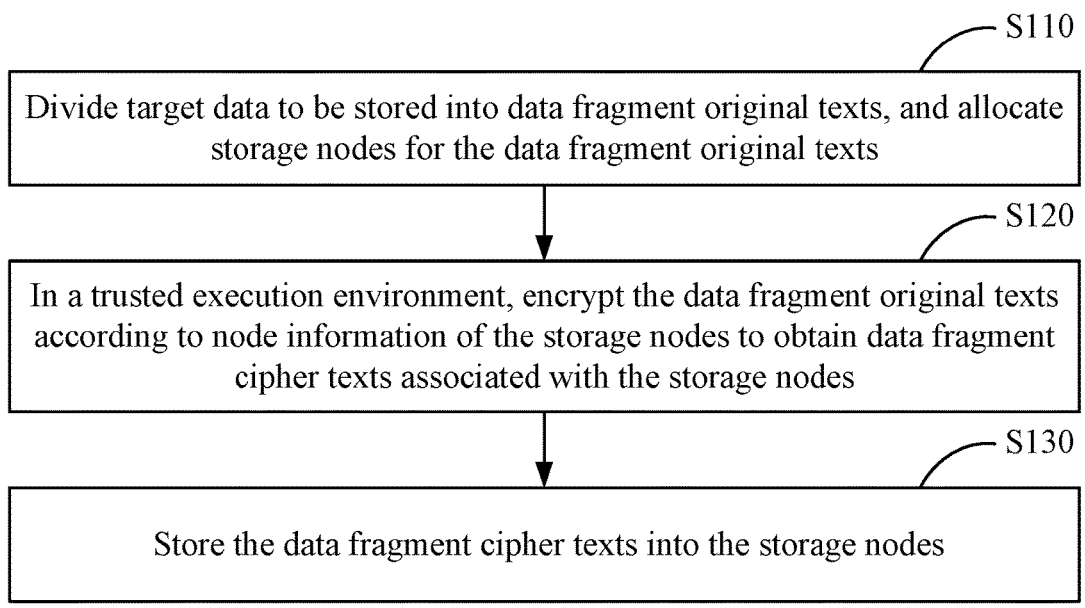
FIG. 2 is a schematic diagram of a data storage method according to an embodiment of the present disclosure.

FIG. 2 is a schematic diagram of a data storage method according to an embodiment of the present disclosure. The embodiments of the present disclosure are applicable to the case of decentralized storage of data. The method may be executed by a data storage apparatus, which may be implemented in hardware and/or software and may be configured in a trusted storage node of the data holder. Referring to FIG. 2, the method includes steps described below.

In S110, target data to be stored is divided into data fragment original texts, and storage nodes are allocated for the data fragment original texts.

In S120, in a trusted execution environment, the data fragment original texts are encrypted according to node information of the storage nodes to obtain data fragment cipher texts associated with the storage nodes.

In S130, the data fragment cipher texts are stored to the storage nodes.

In the storage process of the target data, the trusted storage node serving as the data holder may divide the target data into at least two data fragment original texts according to a preset size (e.g., 4M), perform a hash processing on the data fragment original texts to obtain a hash result, and may use the hash result as identification information of the data fragment original texts. Moreover, at least one storage node is allocated for each data fragment original text from the decentralized storage system. The allocated storage nodes serve as the data storage party and are used for storing data fragment cipher texts related to the data fragment original texts.

In the trusted execution environment, for each data fragment original text, node information of a storage node allocated for the data fragment original text is acquired, and the data fragment original text is encrypted according to the node information of the storage node to obtain a data fragment cipher text of the data fragment original text. The node information of the storage node may be identification information of the storage node. The encryption algorithm is not particularly limited in the embodiments of the present disclosure. It should be noted that the data fragment cipher text is associated with both the data fragment original text and the storage node, and different storage nodes are used for storing different data fragment cipher texts of the same data fragment original text.

The data fragment cipher texts are stored to the storage node instead of directly storing the data fragment original text so that the leakage of the data fragment original text may be avoided, the leakage of the target data is avoided, and a decentralized storage scheme with safety is realized.

Moreover, the data fragment original text is encrypted according to the node information of the storage node, so that data fragment cipher texts of the same data fragment original text which are associated with different storage nodes are different, the cracking difficulty of the data fragment cipher texts can be enhanced, and thus the safety of the decentralized storage scheme is further improved.

After different data fragment cipher texts of one data fragment original text are generated for different storage nodes, the data holder sends these different data fragment cipher texts to the associated storage nodes respectively, and the data fragment cipher texts are stored by the associated storage nodes.

It should be noted that the blockchain may be used for storing metadata, data catalogs, management data required for operation, etc. of the decentralized storage system, for example, node information for recording the storage node, a data catalog and meta-information of the target data, configuration data during operation of the decentralized storage system. For example, after the trusted storage node serving as the data holder divides the target data into the data fragment original texts, the target data may be used as a root node and the data fragment original texts may be used as child nodes to obtain a Merkle Tree structure. Moreover, information about the Merkle tree structure may be written into the blockchain after being encrypted. In order to avoid leakage of the information about the Merkle tree structure, the information about the Merkle tree structure may also be encrypted in the trusted execution environment.

According to the technical scheme provided in the embodiments of the present disclosure, in the decentralized storage scheme, the data fragment original texts are encrypted according to the node information of the storage nodes so that data fragment cipher texts for the same data fragment original text which are associated with different storage nodes are different, the cracking difficulty of the data fragment cipher texts may be enhanced, and thus the safety of the decentralized storage scheme is further improved.

In an implementation manner, the step in which the storage nodes are allocated for the data fragment original texts includes at least two storage nodes are allocated for the data fragment original texts by adopting a redundancy algorithm.

The at least two storage nodes in which the data fragment original texts need to be stored are calculated by adopting a preset redundancy algorithm. Through the redundant disaster recovery backup, at least two storage nodes are respectively used for storing different data fragment cipher texts of one data fragment original text, so that the normal storage of the one data fragment original text can still be ensured in the case where part of the storage nodes are abnormal, and thus the safety of the data storage can be further improved.

Figure 3:
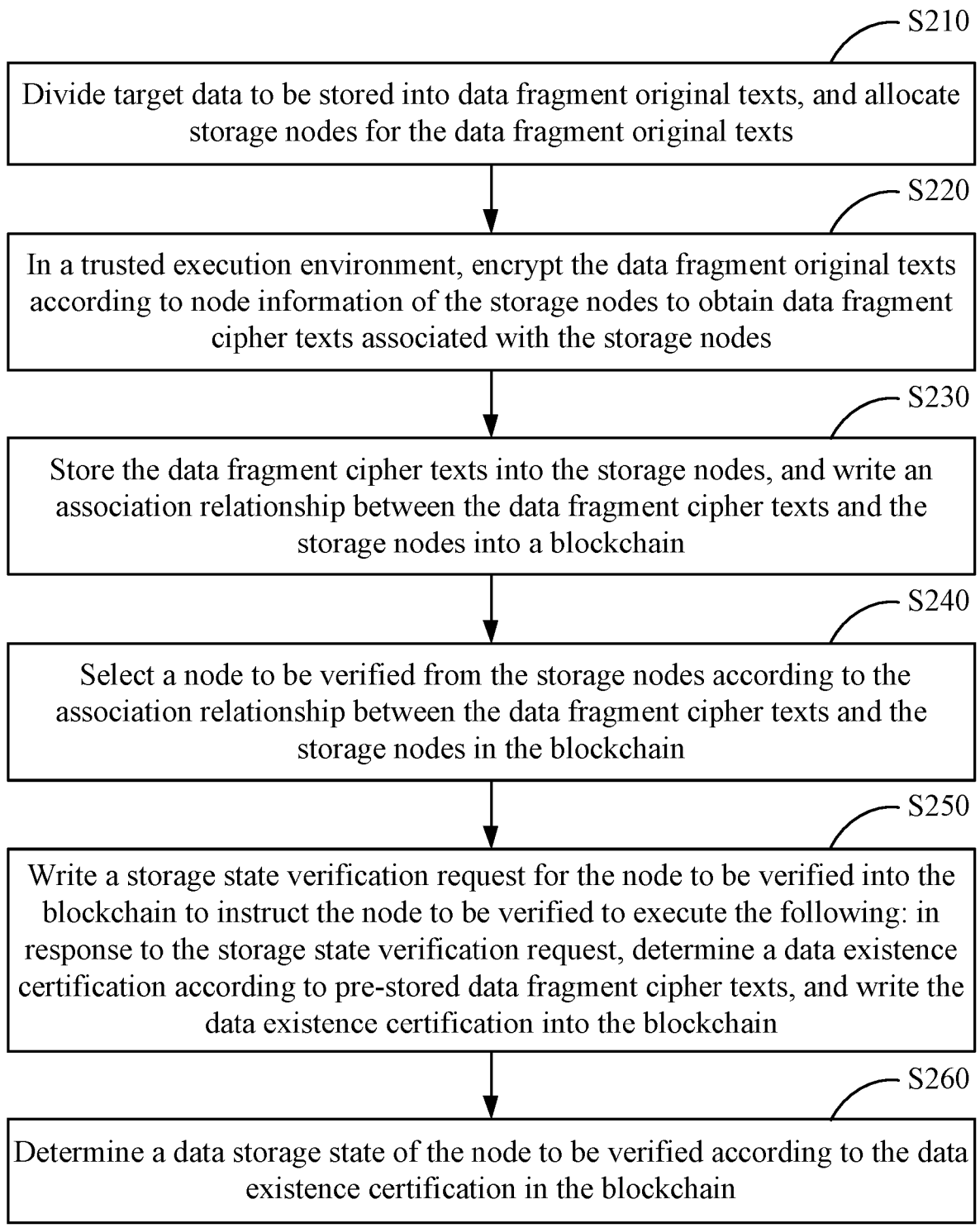
FIG. 3 is a schematic diagram of another data storage method according to an embodiment of the present disclosure.

FIG. 3 is a schematic diagram of another data storage method according to an embodiment of the present disclosure. This embodiment is an alternative scheme proposed on the basis of the embodiments described above. Referring to FIG. 3, a data storage method provided in this embodiment includes steps described below.

In S210, target data to be stored is divided into data fragment original texts, and storage nodes are allocated for the data fragment original texts.

In S220, in a trusted execution environment, the data fragment original texts are encrypted according to node information of the storage nodes to obtain data fragment cipher texts associated with the storage nodes.

In S230, the data fragment cipher texts are stored to the storage nodes, and an association relationship between the data fragment cipher texts and the storage nodes is written into a blockchain.

In S240, a node to be verified is selected from the storage nodes according to the association relationship between the data fragment cipher texts and the storage nodes in the blockchain.

In S250, a storage state verification request for the node to be verified is written into the blockchain to instruct the node to be verified to execute the following: in response to the storage state verification request, a data existence certification is determined according to pre-stored data fragment cipher texts, and the data existence certification is written into the blockchain.

In S260, a data storage state of the node to be verified is determined according to the data existence certification in the blockchain.

In the embodiments of the present disclosure, the blockchain serves as a relay, and the data holder is communicatively connected to the data storage party through the blockchain while no communication connection between the data holder and the data storage party is maintained. The blockchain not only stores the association relationship between the data fragment cipher texts and the storage nodes, but also may store the storage state verification request of the data holder for the node to be verified and the data existence certification provided by the node to be verified.

Moreover, based on a data storage state check strategy, the data holder of the target data may select the node to be verified from the storage nodes storing the data fragment cipher texts of the target data according to the association relationship between the data fragment cipher texts and the storage nodes in the blockchain, generate the storage state verification request for the node to be verified, and write the storage state verification request into the blockchain.

A storage node serving as the data storage party acquires, from the blockchain, a storage state verification request in which the storage node is used as the node to be verified, determines the data existence certification based on the data fragment cipher text stored by the storage node itself, and writes the data existence certification into the blockchain. It should be noted that the manner of certificating the existence of the data is not limited to the embodiments of the present disclosure.

The data holder also acquires a data existence certification associated with the target data from the blockchain, and determines whether the node to be verified stores the data fragment cipher texts as desired according to the data existence certification to obtain the data storage state. The verification result may be that the data storage state is normal, that is, the data fragment cipher texts stored in the node to be verified are correct; or, the verification result may be that the data storage state is abnormal, that is, the data fragment cipher texts stored in the node to be verified are incorrect. The storage state of the data fragment cipher texts is verified, the data storage stability of the decentralized storage system can be improved. Since the data fragment cipher texts are determined according to the node information of the storage nodes, different storage nodes store different fragment cipher texts for the same data fragment original text, that is, different storage nodes provide different data existence certifications of the same data fragment original text, so that the joint maliciousness of different storage nodes for the data existence certification can be avoided, and thus the data safety in the storage system is further improved.

In an implementation manner, the step in which the storage state verification request for the node to be verified is written into the blockchain includes steps described below: a parameter to be verified is determined, where the parameter to be verified includes identification information of the node to be verified, a bit to be verified, a timestamp and a second random number; and the storage state verification request carrying the parameter to be verified is written into the blockchain to instruct the node to be verified to execute the following: the data existence certification is determined according to the pre-stored data fragment cipher text, the bit to be verified, the identification information of the node to be verified, the timestamp and the second random number, and the data existence certification is written into the blockchain.

In the embodiments of the present disclosure, the data holder may select the bit to be verified from a data fragment cipher text of the node to be verified, for example, the $100^{th}$ and $200^{th}$ bits in a certain data fragment cipher text may be used as the bit to be verified. The timestamp may be a timestamp of initiating the storage state verification request. Furthermore, an algorithm for generating the second random number is not limited.

The data holder may determine the identification information of the node to be verified, the bit to be verified, the timestamp and the second random number based on the data storage state check strategy, and write the storage state verification request carrying the identification information of the node to be verified, the bit to be verified, the timestamp and the second random number into the blockchain. The node to be verified acquires the storage state verification request from the blockchain, calculates the data existence certification according to the data fragment cipher texts in the node to be verified, the identification information of the node to be verified in the storage state verification request, the bit to be verified, the timestamp and the second random number, and writes the data existence certification into the blockchain. The data holder verifies the storage state of the node to be verified through the data existence certification provided by the node to be verified, so that the abnormal storage state can be found in time, and thus the stability of the decentralized storage system is further improved.

According to the technical scheme of the embodiments of the present disclosure, the data holder and the data storage party are in the communication connection by using the blockchain as the relay, so that the verification of the storage state of the data fragment cipher texts in the data storage party is implemented by the data holder, and thus the stability of the decentralized storage scheme can be improved.

Figure 4:
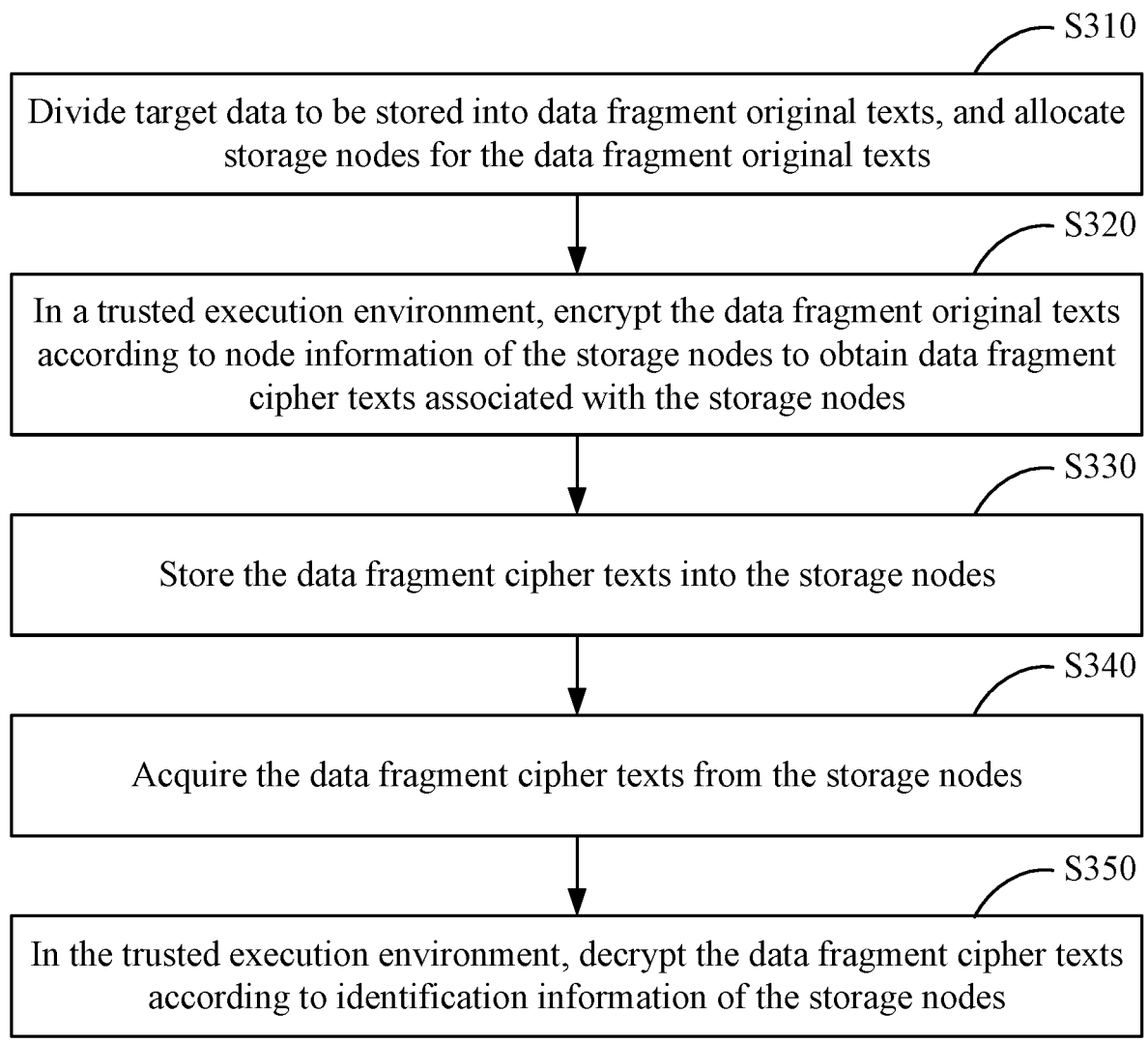
FIG. 4 is a schematic diagram of another data storage method according to an embodiment of the present disclosure.

FIG. 4 is a schematic diagram of another data storage method according to an embodiment of the present disclosure. This embodiment is an alternative scheme proposed on the basis of the embodiments described above. Referring to FIG. 4, a data storage method provided in this embodiment includes steps described below.

In S310, target data to be stored is divided into data fragment original texts, and storage nodes are allocated for the data fragment original texts.

In S320, in a trusted execution environment, the data fragment original texts are encrypted according to node information of the storage nodes to obtain data fragment cipher texts associated with the storage nodes.

In S330, the data fragment cipher texts are stored to the storage nodes.

In S340, the data fragment cipher texts are acquired from the storage nodes.

In S350, in the trusted execution environment, the data fragment cipher texts are decrypted according to identification information of the storage nodes.

In the embodiments of the present disclosure, the data holder may also use the data fragment cipher texts after storing the data fragment cipher texts of the target data to the storage nodes; and other storage nodes except the data holder cannot use the data fragment cipher texts. In an embodiment, the data holder may acquire the pre-stored data fragment cipher texts from the storage nodes, and decrypt the data fragment cipher texts according to the identification information of the storage nodes in the trusted execution environment to obtain the data fragment original texts.

In an implementation manner, the step in which the data fragment original texts are encrypted according to the node information of the storage nodes includes steps described below: in the trusted execution environment, the data fragment original texts, identification information of the data fragment original texts and the node information of the storage nodes are acquired through an encryption interface; an encryption key is generated according to a root key, the identification information of the data fragment original texts, the node information of the storage nodes and a first random number; and the data fragment original texts are encrypted by adopting the encryption key.

In a process of encrypting the data fragment original texts, an encryption interface of an encryption service program (namely, the trusted execution environment) may be invoked, the data fragment original texts, the identification information of the data fragment original texts, and the node information of the storage nodes are used as the incoming information, a key derivation algorithm is invoked according to the identification information of the data fragment original texts, the node information of the storage node and the first random number, and an encryption key is generated according to the root key, where the encryption key has uniqueness, the data fragment original texts are encrypted by adopting the encryption key to obtain the data fragment cipher texts, and the data fragment cipher texts and the first random number are returned through the encryption interface. Since the first random number is generated by the encryption service program and the root key is only stored in the trusted execution environment, the difficulty of inverse solution of the encryption key can be enhanced, and thus the safety of the data fragment cipher texts is further improved.

In an implementation manner, the step in which in the trusted execution environment, the data fragment cipher texts are decrypted according to the identification information of the storage nodes includes steps described below: in the trusted execution environment, a data fragment cipher text, identification information of a data fragment original text associated with the data fragment cipher text, node information of a storage node associated with the data fragment cipher text and a first random number associated with the data fragment cipher text are acquired through a decryption interface; a decryption key is generated according to a root key, the identification information of the data fragment original text, the node information of the storage node and the first random number; and the data fragment cipher text is decrypted by adopting the decryption key.

In an embodiment, the data holder may invoke the decryption interface of the encryption service program (i.e., the trusted execution environment) to transmit the data fragment cipher text, identification information of the data fragment original text associated with the data fragment cipher text, the node information of the storage node and the first random number associated with the data fragment cipher texts; the key derivation algorithm is invoked to generate the decryption key according to the identification information of the data fragment original text, the node information of the storage node and the first random number, the data fragment cipher text is decrypted by adopting the decryption key to obtain the data fragment original text, and the data fragment original text is returned through the decryption interface. It should be noted that the key derivation algorithm is not limited in the embodiments of the present disclosure, and in the case where the key derivation algorithm is a symmetric encryption algorithm, the encryption key is the same as the decryption key; and in the case where the key derivation algorithm is an asymmetric encryption algorithm, the encryption key and the decryption key are an asymmetric key pair. Since the root key of the data holder is unique and safe, only the data holder may decrypt its own data fragment cipher texts, and the leakage of the data fragment original texts can be avoided.

According to the technical scheme of the embodiments of the present disclosure, the data holder not only can store the data fragment cipher texts of the target data to the storage node, but also can decrypt and use its own data fragment original texts.

An embodiment of the present disclosure provides a decentralized and trusted storage method. In this embodiment, a trusted storage system includes a blockchain access layer, a storage engine, a trusted computing engine and a storage medium layer. The blockchain access layer is responsible for communicating with a blockchain network and providing the function of reading and writing on-chain data. The trusted storage system uses the blockchain to store metadata, data catalogs and management data required for operation of the storage system, for example, the trusted storage system is used for storing node information of the decentralized storage nodes, data catalogs and meta-information of user data, data existence certifications, other management data required for system operation such as configuration data in the operation process of the trusted storage system.

The storage engine is responsible for operations such as fragmentation, encryption and recovery of data, access control and storage node management and the storage engine is a core module of the trusted storage system.

The storage engine is configured for data fragmentation. For example, user data to be stored (namely the target data) is sliced into at least two data fragment original texts according to a preset size, and hash values of these data fragment original texts are used as identifications (IDs) of the data fragment original texts. Moreover, a Merkle tree structure between the target data and the data fragment original texts is constructed, and information about the Merkle tree structure is encrypted and stored in the on-chain manner.

The storage engine is also configured for data redundancy storage. For each data fragment, several storage nodes in which the data fragment is stored are calculated according to a preset redundancy algorithm, the data fragment original text is encrypted according to node information of the storage nodes to obtain data fragment cipher texts associated with both the data fragment original text and the storage nodes, and the data fragment cipher texts are sent to the associated storage nodes for storage. The association relationship between the data fragment cipher texts and the storage nodes may also be stored in the on-chain manner.

The storage engine is further configured for the data existence certification. When the data holder sends the data fragment cipher texts to the storage nodes for storage, several-bit data may be randomly extracted from the data fragment cipher texts, and indexes of the several-bit data in the data fragment cipher texts and values of the extracted several-bit data are encrypted and then stored in the on-chain manner to be used in the process of verifying the data existence certification of the storage node by the data holder. The data holder irregularly selects to-be-verified bit data (for example, the $100^{th}$ and $200^{th}$ bits in a certain data fragment cipher text) based on the data storage state check strategy and issues a storage state verification request to the blockchain by adopting node information of a storage node associated with the to-be-verified bit data, a timestamp and a second random number. In response to the storage state verification request in the blockchain, the data existence certification is calculated by the node to be verified according to the bit to be verified, the identification information of the node to be verified, the timestamp and the second random number, and the data existence certification is issued on the blockchain. The data holder may determine whether the node to be verified truly stores the data fragment cipher texts as desired according to the data existence certification in the blockchain.

The storage engine is also configured for the access control. Because only the trusted storage node serving as the data holder has the encryption key, only the trusted storage node serving as the data holder may decrypt and acquire the data fragment original texts.

The trusted computing engine is responsible for the encryption and decryption of data. When the data fragment original texts need to be encrypted, the encryption interface of the encryption service program is invoked, the data fragment original texts, the IDs of the data fragment original texts and identification information of storage nodes for storage are used as the incoming information, and the first random number is generated within the encryption service program; and a unique encryption key is derived according to the root key, the IDs of the data fragment original texts, the identification information of the storage nodes and the first random number based on the key derivation algorithm, the data fragment original texts are encrypted by using the encryption key, and the data fragment cipher texts and the first random number are returned.

When the data fragment cipher texts need to be decrypted, a decryption interface of the encryption service program is invoked, and the data fragment cipher texts, an ID of the data fragment original text, node information of a storage node storing the data fragment cipher text and the first random number are used as the incoming information; the root key is restored by adopting the key derivation algorithm according to the ID of the data fragment original text, the node information of the storage node and the first random number to obtain a decryption key; the data fragment cipher text is decrypted by adopting the decryption key, and the data fragment original text is returned.

The storage medium layer is responsible for transparent storage of the data fragment, the storage medium layer does not need to care about formats and contents of the data fragments, only provides operations such as reading, writing and deleting of the data fragments to the outside, and the storage medium layer has the following characteristics that: the operations such as reading, writing and deleting of the data fragments are provided to the outside, the storage medium layer is an abstract physical storage medium, the local disk storage is supported, and the multi-disk management is supported.

The embodiments of the present disclosure provide a decentralized trusted storage scheme having a storage capacity that may be scaled out, the scheme may be used in a decentralized scenario such as an enterprise alliance, or data encryption storage and based on a trusted execution environment constructed by hardware, and the decentralized trusted storage scheme further supports the data holder to decrypt the data fragment cipher texts in the trusted execution environment so that the effect that the data is available and invisible is achieved.

Figure 5:
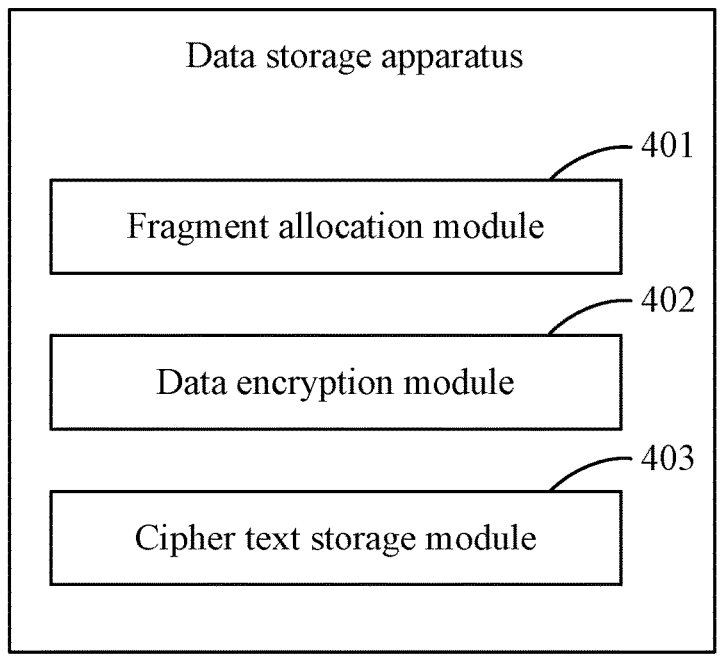
FIG. 5 is a schematic diagram of a data storage apparatus according to an embodiment of the present disclosure.

FIG. 5 is a schematic diagram of a data storage apparatus according to an embodiment of the present disclosure. This embodiment may be applied to the case of decentralized storage of data, and the apparatus is configured in a trusted storage node of the data holder, so that the data storage method described in any embodiment of the present disclosure may be implemented. Referring to FIG. 5, the data storage apparatus 400 includes a fragment allocation module 401, a data encryption module 402 and a cipher text storage module 403. The fragment allocation module 401 is configured to divide target data to be stored to data fragment original texts, and allocate storage nodes for the data fragment original texts. The data encryption module 402 is configured to encrypt, in a trusted execution environment, the data fragment original texts according to node information of the storage nodes to obtain data fragment cipher texts associated with the storage nodes. The cipher text storage module 403 is configured to store the data fragment cipher texts to the storage nodes.

In an implementation manner, the data encryption module 402 includes an acquisition unit, an encryption key unit and a data encryption unit. The acquisition unit is configured to acquire, in the trusted execution environment, the data fragment original texts, identification information of the data fragment original texts, and the node information of the storage nodes through an encryption interface. The encryption key unit is configured to generate an encryption key according to a root key, the identification information of the data fragment original texts, the node information of the storage nodes and a first random number. The data encryption unit is configured to encrypt the data fragment original texts by adopting the encryption key.

In an implementation manner, the data storage apparatus 400 further includes an association relationship on-chain module, and the association relationship chain-up module is configured to write an association relationship between the data fragment cipher texts and the storage nodes into a blockchain after the data fragment cipher texts are stored to the storage nodes.

The data storage apparatus 400 further includes a storage state verification module, and the storage state verification module includes a node selection unit, a verification request on-chain unit and a storage state verification unit. The node selection unit is configured to select a node to be verified from the storage nodes according to the association relationship between the data fragment cipher texts and the storage nodes in the blockchain. The verification request on-chain unit is configured to write a storage state verification request for the node to be verified into the blockchain to instruct the node to be verified to execute the following: in response to the storage state verification request, a data existence certification is determined according to the pre-stored data fragment cipher texts, and the data existence certification is written into the blockchain. The storage state verification unit is configured to determine a data storage state of the node to be verified according to the data existence certification in the blockchain.

In an implementation manner, the verification request on-chain-up unit is configured to: determine a parameter to be verified, where the parameter to be verified includes identification information of the node to be verified, a bit to be verified, a timestamp and a second random number; and write the storage state verification request carrying the parameter to be verified into the blockchain to instruct the node to be verified to execute the following: the data existence certification is determined according to the pre-stored data fragment cipher texts, the bit to be verified, the identification information of the node to be verified, the timestamp and the second random number, and the data existence certification is written into the blockchain.

In an implementation manner, the data storage apparatus 400 further includes a data decryption module, and the data decryption module includes a cipher text acquisition unit and a cipher text decryption unit. The cipher text acquisition unit is configured to acquire the data fragment cipher texts from the storage nodes. The cipher text decryption unit is configured to decrypt, in the trusted execution environment, the data fragment cipher texts according to identification information of the storage nodes.

In an implementation manner, the cipher text decryption unit is specifically configured to: acquire, in the trusted execution environment, a data fragment cipher text, identification information of a data fragment original text associated with the data fragment cipher text, node information of a storage node associated with the data fragment cipher text, and a first random number associated with the data fragment cipher text through a decryption interface; generate a decryption key according to a root key, the identification information of the data fragment original text, the node information of the storage node and the first random number; and decrypt the data fragment cipher text by adopting the decryption key.

In an optional implementation manner, the fragment allocation module 401 is configured to allocate at least two storage nodes for the data fragment original texts by adopting a redundancy algorithm.

According to the technical scheme of this embodiment, the data fragment original texts are encrypted according to the node information of the storage nodes, so that data fragment cipher texts for the same data fragment original text which are associated with different storage nodes are different, the cracking difficulty of the data fragment cipher texts can be enhanced, and thus the safety of the decentralized storage scheme is further improved.

According to the embodiments of the present disclosure, the present disclosure further provides an electronic device, a readable storage medium and a computer program product.

Figure 6:
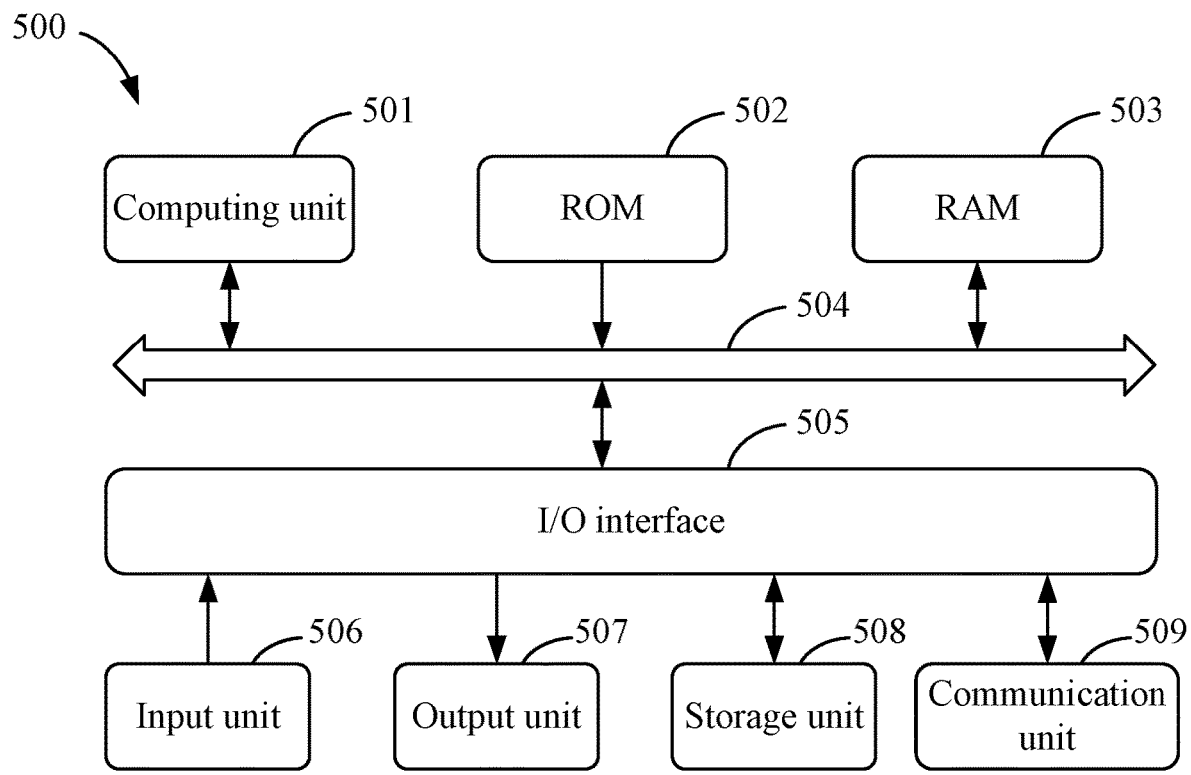
FIG. 6 is a block diagram of an electronic device for implementing a data storage method in an embodiment of the present disclosure.

FIG. 6 shows a schematic block diagram of an exemplary electronic device 500 that may be used for implementing the embodiments of the present disclosure. The electronic device is intended to represent various forms of digital computers, such as laptops, desktops, workstations, personal digital assistants, servers, blade servers, mainframe computers, and other appropriate computers. The electronic device may also represent various forms of mobile devices, such as personal digital processing, cellphones, smartphones, wearable devices, and other similar computing devices. The components shown herein, their connections and relationships between these components, and the functions of these components, are illustrative only and not intended to limit implementations of the present disclosure described and/or claimed herein.

As shown in FIG. 6, the device 500 includes a computing unit 501, the computing unit 501 may perform various appropriate actions and processes according to a computer program stored in a read-only memory (ROM) 502 or a computer program loaded from a storage unit 508 to a random-access memory (RAM) 503. The RAM 503 may also store various programs and data required for the operation of the device 500. The computing unit 501, the ROM 502, and the RAM 503 are connected via a bus 504. An input/output (I/O) interface 505 is also connected to the bus 504.

Multiple components in the device 500 are connected to the I/O interface 505, and the multiple components include an input unit 506 such as a keyboard or a mouse; an output unit 507 such as various types of displays or speakers; the storage unit 508 such as a magnetic disk or an optical disk; and a communication unit 509 such as a network card, a modem or a wireless communication transceiver. The communication unit 509 allows the device 500 to exchange information/data with other devices over a computer network such as the Internet and/or various telecommunication networks.

The computing unit 501 may be a variety of general-purpose and/or dedicated processing assemblies having processing and calculating capabilities. Some examples of the computing unit 501 include, but are not limited to, a central processing unit (CPU), a graphics processing unit (GPU), a special-purpose artificial intelligence (AI) computing chips, a computing unit executing machine learning model algorithms, a digital signal processor (DSP) and any suitable processor, controller and microcontroller. The computing unit 501 performs the various methods and processes described above, such as the data storage method. For example, in some embodiments, the data storage method may be implemented as computer software programs tangibly embodied in a machine-readable medium, such as the storage unit 508. In some embodiments, part or all of computer programs may be loaded and/or installed on the device 500 via the ROM 502 and/or the communication unit 509. When the computer program is loaded to the RAM 503 and executed by the computing unit 501, one or more steps of the data storage method described above may be executed. Alternatively, in other embodiments, the computing unit 501 may be configured in any other suitable manners (e.g., by means of firmware), to perform the data storage method.

Various implementations of the systems and technologies described above herein may be achieved in digital electronic circuit systems, integrated circuit systems, field-programmable gate arrays (FPGAs), application-specific integrated circuits (ASICs), application-specific standard products (ASSPs), systems on chip (SOCs), complex programmable logic devices (CPLDs), computer hardware, firmware, software, and/or combinations thereof. These various implementations may include implementation in one or more computer programs, and the one or more computer programs are executable and/or interpretable on a programmable system including at least one programmable processor, the programmable processor may be a special-purpose or general-purpose programmable processor for receiving data and instructions from a memory system, at least one input device and at least one output device and transmitting data and instructions to the memory system, the at least one input device and the at least one output device.

Program codes for implementing the methods of the present disclosure may be written in any combination of one or more programming languages. These program codes may be provided for the processor or controller of a general-purpose computer, a special-purpose computer, or another programmable data processing device to enable the functions/operations specified in a flowchart and/or a block diagram to be implemented when the program codes are executed by the processor or controller. The program codes may be executed entirely on a machine, partly on the machine, as a stand-alone software package, partly on the machine and partly on a remote machine, or entirely on the remote machine or server.

In the context of the present disclosure, a machine-readable medium may be a tangible medium that may contain or store a program available for an instruction execution system, apparatus or device or a program used in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any appropriate combination of the foregoing. More specific examples of the machine-readable storage medium may include an electrical connection based on one or more wires, a portable computer diskette, a hard disk, a random access memory (RAM), a read-only memory (ROM), an erasable programmable read-only memory (EPROM) or a flash memory, an optical fiber, a portable compact disc read-only memory (CD-ROM), an optical storage device, a magnetic storage device, or any appropriate combination of the foregoing.

To provide the interaction with a user, the systems and technologies described here may be implemented on a computer. The computer has a display device (e.g., a cathode ray tube (CRT) or liquid-crystal display (LCD) monitor) for displaying information to the user; and a keyboard and a pointing device (e.g., a mouse or a trackball) through which the user may provide input to the computer. Other kinds of devices may also be used for providing for interaction with the user; for example, feedback provided to the user may be any form of sensory feedback in any form (such as visual feedback, auditory feedback, or haptic feedback); and input from the user may be received in any form (including acoustic input, speech input, or haptic input).

The systems and technologies described here may be implemented in a computing system including a back-end component (e.g., a data server), or a computing system including a middleware component (such as, an application server), or a computing system including a front-end component (e.g., a client computer having a graphical user interface or a web browser through which the user may interact with the implementations of the systems and technologies described herein), or a computing system including any combination of such back-end component, middleware component, or front-end component. The components of the system may be interconnected by any form or medium of digital data communication (for example, a communication network). Examples of the communication network include a local area network (LAN), a wide area network (WAN), a blockchain network and the Internet.

The computing system may include clients and servers. A client and a server are generally remote from each other and typically interact through the communication network. A relationship between the clients and the servers arises by virtue of computer programs running on respective computers and having a client-server relationship to each other. The server may be a cloud server, also referred to as a cloud computing server or a cloud host. As a host product in a cloud computing service system, the server solves the defects of difficult management and weak service scalability in a traditional physical host and a related virtual private server (VPS) service.

It should be understood that various forms of the flows shown above, reordering, adding or deleting steps may be used. For example, the steps described in the present disclosure may be executed in parallel, sequentially or in different orders as long as the desired result of the technical scheme provided in the present disclosure may be achieved. The execution sequence of these steps is not limited herein.

The above implementations should not be construed as limiting the protection scope of the present disclosure. It should be understood by those skilled in the art that various modifications, combinations, sub-combinations and substitutions may be made, depending on design requirements and other factors. Any modification, equivalent replacement, and improvement made within the spirit and principle of the present disclosure should be included within the protection scope of the present disclosure.

What is claimed is:

1. A data storage method, comprising:
   dividing target data to be stored into data fragment original texts, and allocating storage nodes for the data fragment original texts;
   in a trusted execution environment, encrypting the data fragment original texts according to node information of the storage nodes to obtain data fragment cipher texts associated with the storage nodes; and
   storing the data fragment cipher texts to the storage nodes; wherein in the trusted execution environment, encrypting the data fragment original texts according to the node information of the storage nodes comprises:
   in the trusted execution environment, acquiring a data fragment original text, identification information of the data fragment original text and node information of a storage node allocated for the data fragment original text through an encryption interface;
   generating an encryption key according to a root key, the identification information of the data fragment original text, the node information of the storage node and a first random number; and
   encrypting the data fragment original text by adopting the encryption key.

2. The method of claim 1, wherein after storing the data fragment cipher texts to the storage nodes, the method further comprises: writing an association relationship between the data fragment cipher texts and the storage nodes into a blockchain;
   selecting a node to be verified from the storage nodes according to the association relationship between the data fragment cipher texts and the storage nodes in the blockchain;
   writing a storage state verification request for the node to be verified into the blockchain to instruct the node to be verified to execute the following: in response to the storage state verification request, determining a data existence certification according to pre-stored data fragment cipher texts, and writing the data existence certification into the blockchain; and
   determining a data storage state of the node to be verified according to the data existence certification in the blockchain.

3. The method of claim 2, wherein writing the storage state verification request for the node to be verified into the blockchain comprises:
- determining a parameter to be verified, wherein the parameter to be verified comprises identification information of the node to be verified, a bit to be verified, a timestamp and a second random number; and
- writing the storage state verification request carrying the parameter to be verified into the blockchain to instruct the node to be verified to execute the following: determining the data existence certification according to the pre-stored data fragment cipher texts, the bit to be verified, the identification information of the node to be verified, the timestamp and the second random number, and writing the data existence certification into the blockchain.

4. The method of claim 1, wherein after storing the data fragment cipher texts to the storage nodes, the method further comprises:
- acquiring the data fragment cipher texts from the storage nodes; and
- in the trusted execution environment, decrypting the data fragment cipher texts according to identification information of the storage nodes.

5. The method of claim 4, wherein in the trusted execution environment, decrypting the data fragment cipher texts according to the identification information of the storage nodes comprises:
- in the trusted execution environment, acquiring a data fragment cipher text, identification information of a data fragment original text associated with the data fragment cipher text, node information of a storage node associated with the data fragment cipher text and a first random number associated with the data fragment cipher text through a decryption interface;
- generating a decryption key according to a root key, the identification information of the data fragment original text, the node information of the storage node and the first random number; and
- decrypting the data fragment cipher text by adopting the decryption key.

6. The method of claim 1, wherein allocating the storage nodes for the data fragment original texts comprises:
- allocating at least two storage nodes for the data fragment original texts by adopting a redundancy algorithm.

7. An electronic device, comprising:
- at least one processor; and
- a memory communicatively connected to the at least one processor;
- wherein the memory stores an instruction executable by the at least one processor, and the instruction, when executed by the at least one processor, causes the at least one processor to perform the following steps:
- dividing target data to be stored into data fragment original texts, and allocating storage nodes for the data fragment original texts;
- in a trusted execution environment, encrypting the data fragment original texts according to node information of the storage nodes to obtain data fragment cipher texts associated with the storage nodes; and
- storing the data fragment cipher texts to the storage nodes;
- wherein the at least one processor is caused to perform in the trusted execution environment, encrypting the data fragment original texts according to the node information of the storage nodes by:
- in the trusted execution environment, acquiring a data fragment original text, identification information of the data fragment original text and node information of a storage node allocated for the data fragment original text through an encryption interface;
- generating an encryption key according to a root key, the identification information of the data fragment original text, the node information of the storage node and a first random number; and
- encrypting the data fragment original texts by adopting the encryption key.

8. The electronic device of claim 7, wherein after the data fragment cipher texts are stored to the storage nodes, the at least one processor is caused to further perform the following steps:
- writing an association relationship between the data fragment cipher texts and the storage nodes into a blockchain;
- selecting a node to be verified from the storage nodes according to the association relationship between the data fragment cipher texts and the storage nodes in the blockchain;
- writing a storage state verification request for the node to be verified into the blockchain to instruct the node to be verified to execute the following: in response to the storage state verification request, determining a data existence certification according to pre-stored data fragment cipher texts, and writing the data existence certification into the blockchain; and
- determining a data storage state of the node to be verified according to the data existence certification in the blockchain.

9. The electronic device of claim 8, wherein the at least one processor is caused to perform writing the storage state verification request for the node to be verified into the blockchain by:
- determining a parameter to be verified, wherein the parameter to be verified comprises identification information of the node to be verified, a bit to be verified, a timestamp and a second random number; and
- writing the storage state verification request carrying the parameter to be verified into the blockchain to instruct the node to be verified to execute the following: determining the data existence certification according to the pre-stored data fragment cipher texts, the bit to be verified, the identification information of the node to be verified, the timestamp and the second random number, and writing the data existence certification into the blockchain.

10. The electronic device of claim 7, wherein after the data fragment cipher texts are stored to the storage nodes, the at least one processor is caused to further perform the following steps:
- acquiring the data fragment cipher texts from the storage nodes; and
- in the trusted execution environment, decrypting the data fragment cipher texts according to identification information of the storage nodes.

11. The electronic device of claim 10, wherein the at least one processor is caused to perform in the trusted execution environment, decrypting the data fragment cipher texts according to the identification information of the storage nodes by:
- in the trusted execution environment, acquiring a data fragment cipher text, identification information of a data fragment original text associated with the data fragment cipher text, node information of a storage node associated with the data fragment cipher text and a first random number associated with the data fragment cipher text through a decryption interface;

generating a decryption key according to a root key, the identification information of the data fragment original text, the node information of the storage node and the first random number; and decrypting the data fragment cipher text by adopting the decryption key.

12. The electronic device of claim 7, wherein the at least one processor is caused to perform allocating the storage nodes for the data fragment original texts by:

allocating at least two storage nodes for the data fragment original texts by adopting a redundancy algorithm.

13. A non-transitory computer readable storage medium storing a computer instruction, wherein the computer instruction is configured to cause a computer to perform the following steps:

dividing target data to be stored into data fragment original texts, and allocating storage nodes for the data fragment original texts;

in a trusted execution environment, encrypting the data fragment original texts according to node information of the storage nodes to obtain data fragment cipher texts associated with the storage nodes; and storing the data fragment cipher texts to the storage nodes; wherein the computer instruction is configured to cause the computer to perform in the trusted execution environment, encrypting the data fragment original texts according to the node information of the storage nodes by:

in the trusted execution environment, acquiring a data fragment original text, identification information of the data fragment original text and node information of a storage node allocated for the data fragment original text through an encryption interface;

generating an encryption key according to a root key, the identification information of the data fragment original text, the node information of the storage node and a first random number; and encrypting the data fragment original texts by adopting the encryption key.

14. The storage medium of claim 13, wherein after the data fragment cipher texts are stored to the storage nodes, the computer instruction is configured to cause the computer to further perform the following steps:

writing an association relationship between the data fragment cipher texts and the storage nodes into a blockchain;

selecting a node to be verified from the storage nodes according to the association relationship between the data fragment cipher texts and the storage nodes in the blockchain;

writing a storage state verification request for the node to be verified into the blockchain to instruct the node to be verified to execute the following: in response to the storage state verification request, determining a data existence certification according to pre-stored data fragment cipher texts, and writing the data existence certification into the blockchain; and determining a data storage state of the node to be verified according to the data existence certification in the blockchain.

15. The storage medium of claim 14, wherein the computer instruction is configured to cause the computer to perform writing the storage state verification request for the node to be verified into the blockchain by:

determining a parameter to be verified, wherein the parameter to be verified comprises identification information of the node to be verified, a bit to be verified, a timestamp and a second random number; and writing the storage state verification request carrying the parameter to be verified into the blockchain to instruct the node to be verified to execute the following: determining the data existence certification according to the pre-stored data fragment cipher texts, the bit to be verified, the identification information of the node to be verified, the timestamp and the second random number, and writing the data existence certification into the blockchain.

16. The storage medium of claim 13, wherein after the data fragment cipher texts are stored to the storage nodes, the computer instruction is configured to cause the computer to further perform the following steps:

acquiring the data fragment cipher texts from the storage nodes; and in the trusted execution environment, decrypting the data fragment cipher texts according to identification information of the storage nodes.

17. The storage medium of claim 16, wherein the computer instruction is configured to cause the computer to perform in the trusted execution environment, decrypting the data fragment cipher texts according to the identification information of the storage nodes by:

in the trusted execution environment, acquiring a data fragment cipher text, identification information of a data fragment original text associated with the data fragment cipher text, node information of a storage node associated with the data fragment cipher text and a first random number associated with the data fragment cipher text through a decryption interface;

generating a decryption key according to a root key, the identification information of the data fragment original text, the node information of the storage node and the first random number; and decrypting the data fragment cipher text by adopting the decryption key.

18. The storage medium of claim 13, wherein the computer instruction is configured to cause the computer to perform allocating the storage nodes for the data fragment original texts by:

allocating at least two storage nodes for the data fragment original texts by adopting a redundancy algorithm.

* * * * *